(12) United States Patent
Xu et al.

(10) Patent No.: US 11,314,599 B2
(45) Date of Patent: Apr. 26, 2022

(54) METHOD, APPARATUS AND COMPUTER PROGRAM PRODUCT FOR DATA REPLICATION

(71) Applicant: EMC IP Holding Company LLC, Hopkinton, MA (US)

(72) Inventors: Hongru Xu, Shanghai (CN); Tianfang Xiong, Shanghai (CN); Qiu Shang, Shanghai (CN); Yue Qian, Shanghai (CN); Fei Long, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 477 days.

(21) Appl. No.: 16/360,300

(22) Filed: Mar. 21, 2019

(65) Prior Publication Data
US 2019/0384676 A1    Dec. 19, 2019

(30) Foreign Application Priority Data
Jun. 15, 2018 (CN) .......................... 201810634970.5

(51) Int. Cl.
*G06F 11/14* (2006.01)
(52) U.S. Cl.
CPC ...... *G06F 11/1458* (2013.01); *G06F 2201/84* (2013.01)
(58) Field of Classification Search
CPC .......................... G06F 11/1458; G06F 2201/84
USPC ......................................................... 707/649
See application file for complete search history.

(56) References Cited

U.S. PATENT DOCUMENTS

| 7,769,722 | B1 | 8/2010 | Bergant et al. |
|---|---|---|---|
| 8,156,195 | B2 | 4/2012 | Hagglund et al. |
| 8,332,687 | B1 | 12/2012 | Natanzon et al. |
| 8,335,761 | B1 | 12/2012 | Natanzon |
| 8,335,771 | B1 | 12/2012 | Natanzon et al. |
| 8,694,700 | B1 | 4/2014 | Natanzon et al. |
| 8,706,833 | B1 | 4/2014 | Bergant et al. |
| 9,026,696 | B1 | 5/2015 | Natanzon et al. |
| 9,152,578 | B1 | 10/2015 | Saad et al. |
| 9,323,750 | B2 | 4/2016 | Natanzon et al. |
| 9,383,928 | B2 | 7/2016 | Webman et al. |
| 9,569,455 | B1 | 2/2017 | Bono et al. |
| 9,658,797 | B1 | 5/2017 | Elliott, IV et al. |
| 10,289,325 | B1 | 5/2019 | Bono |
| 10,498,821 | B1 | 12/2019 | Bono et al. |
| 10,552,072 | B1 | 2/2020 | Bono et al. |
| 10,613,793 | B1 | 4/2020 | Hu et al. |
| 10,684,926 | B2 | 6/2020 | Chen et al. |
| 10,789,017 | B1 | 9/2020 | Bono et al. |
| 10,831,718 | B1 | 11/2020 | Bono |

(Continued)

*Primary Examiner* — Joshua Bullock
(74) *Attorney, Agent, or Firm* — BainwoodHuang

(57) ABSTRACT

Techniques perform data backup. Such techniques involve: in response to a first storage node to be switched to a second storage node, determining whether there is an ongoing data backup operation between the first storage node and a third storage node; and in response to the ongoing data backup operation between the first and third storage nodes, ceasing the data backup operation. The second storage node is used for backing up data of the first storage node in real time and the third storage node is used for backing up the data of the first storage node periodically. Accordingly, colliding operations can be prevented, system resource can be saved and processing efficiency can be improved.

20 Claims, 6 Drawing Sheets

(56) References Cited

U.S. PATENT DOCUMENTS

| | | |
|---|---|---|
| 10,852,987 B2 | 12/2020 | Hu et al. |
| 2007/0283186 A1 | 12/2007 | Madnani et al. |
| 2007/0288526 A1 | 12/2007 | Mankad et al. |
| 2007/0294319 A1 | 12/2007 | Mankad et al. |
| 2009/0030986 A1* | 1/2009 | Bates .................. G06F 3/065 709/205 |
| 2010/0088556 A1* | 4/2010 | Ikeda ............... G06F 11/2069 714/54 |
| 2011/0093855 A1 | 4/2011 | Kast |
| 2014/0304380 A1 | 10/2014 | Waas et al. |
| 2016/0048430 A1* | 2/2016 | Bolik ............... G06F 11/1469 711/162 |
| 2019/0012238 A1* | 1/2019 | Butterworth ........ G06F 11/2025 |

* cited by examiner

METHOD, APPARATUS AND COMPUTER PROGRAM PRODUCT FOR DATA REPLICATION

CROSS-REFERENCE TO RELATED APPLICATION(S)

This application claims priority to Chinese Patent Application No. CN201810634970.5, on file at the China National Intellectual Property Administration (CNIPA), having a filing date of Jun. 15, 2018, and having "METHOD, APPARATUS AND COMPUTER PROGRAM PRODUCT FOR DATA REPLICATION" as a title, the contents and teachings of which are herein incorporated by reference in their entirety.

FIELD

Embodiments of the present disclosure generally relate to the field of data storage, and more specifically, to a method, apparatus and computer program product for data backup.

BACKGROUND

A storage system is generally used for providing data storage and services. To prevent the storage system from failure and resulting in data loss, or to facilitate configuring the storage system proactively without suspending services, in addition to a primary storage node for providing service, a plurality of backup storage nodes are also provided in the storage system for backing up data of the primary storage node. In practice, backup methods mainly include real-time backup (for performing data backup operation in real time) and regular backup (for performing data backup operation periodically). The storage nodes for real-time backup are updated synchronically whenever the primary storage node is updated in data and thus, maintains data synchronization with the primary storage node all the time. In this way, the backup effect is good although the backup cost is high, accordingly; in contrast, the storage nodes for regular backup may be synchronized with the primary storage node as needed in a period of several months, days or hours. This way of synchronization does not require real-time performance, and thus the backup cost is low. However, the data thereon is not always consistent with that on the primary storage node.

For the two requirements of multiple backups and cost saving, one solution is to configure a real-time backup storage node and a regular backup storage node simultaneously for the primary storage node in the storage system. When the primary storage node is incapable to provide service (for instance, being failure or needs to be reconfigured), the primary storage node switches to the real-time backup storage node. Then, the real-time backup storage node replaces the primary storage node to provide service while the regular backup storage node changes to back up data for the real-time backup storage node. However, during the switch process, if the primary storage node happens to performing data backup to the regular backup storage node, problems like data collision might be incurred.

SUMMARY

Embodiments of the present disclosure provide a method, apparatus and computer program product for data backup. In a first aspect of the present disclosure, there is provided a method for data backup. The method includes: in response to a switch to be performed from a first storage node to a second storage node, determining whether there is an ongoing data backup operation between the first storage node and a third storage node, and in response to the ongoing data backup operation between the first and third storage nodes, ceasing the data backup operation. The second storage node is used for backing up data of the first storage node in real time, and the third storage node is used for backing up the data of the first storage node periodically.

In a second aspect of the present disclosure, there is provided an apparatus for data backup. The apparatus includes: a processor and a memory coupled to the processor, the memory having instructions stored therein which, when executed by the processor, cause the apparatus to perform acts, including: in response to a switch to be performed from a first storage node to a second storage node, determining whether there is an ongoing data backup operation between the first storage node and a third storage node, and in response to the ongoing data backup operation between the first and third storage nodes, ceasing the data backup operation. The second storage node is used for backing up data of the first storage node in real time, and the third storage node is used for backing up the data of the first storage node periodically.

In a third aspect of the present disclosure, there is provided a computer program product being tangibly stored on a computer readable medium and including machine executable instructions which, when executed, cause a machine to perform the method according to the first aspect.

This Summary part is provided to introduce a selection of concepts in a simplified form that are further described below in the Detailed Description part. This Summary part is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of present disclosure, the same reference signs usually represent the same components.

DETAILED DESCRIPTION OF EMBODIMENTS

Figure 1A:
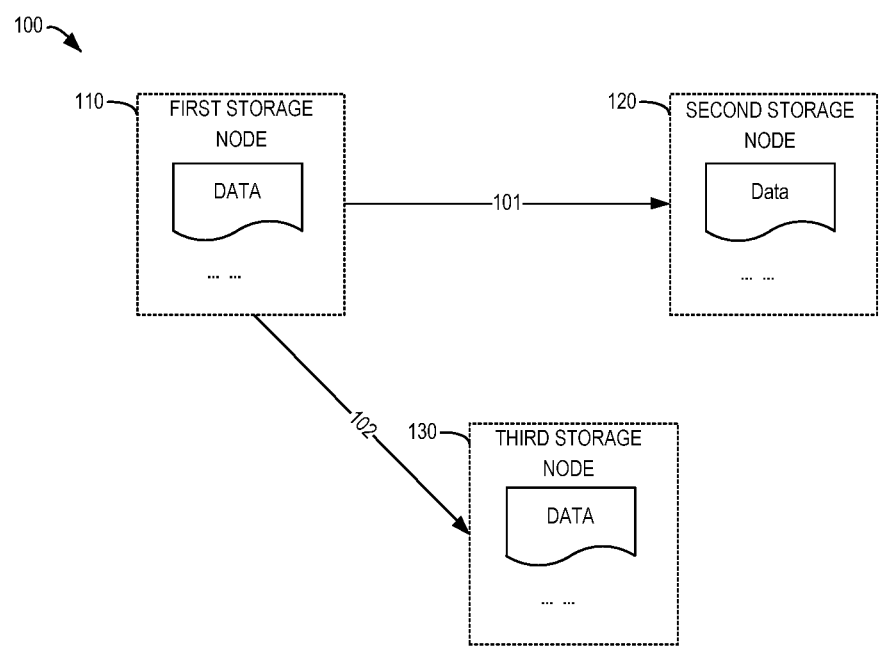
FIGS. 1A and 1B are schematic diagrams illustrating an environment in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to various example embodiments illustrated in the drawings. Although preferred embodiments of present disclosure are displayed in the drawings, it should be understood that these embodiments are described only to enable those skilled in the art to better understand and further implement the present disclosure, rather than for limiting the scope disclosed herein in any manner.

As used herein, the term "include" and its variants are to be read as open-ended terms that mean "include, but not limit to." The term "or" is to be read as "and/or" unless otherwise stated. The term "based on" is to be read as "based at least in part on." The term "an/one example embodiment" and "an/one embodiment" are to be read as "at least one example embodiment." The term "another embodiment" is to be read as "at least one other embodiment." Terms "a first", "a second" and others can denote different or identical objects. The followings may also contain other explicit or implicit definitions.

The term "data" as used herein includes data in various forms and containing varied content in a storage system, such as electronic documents, image data, video data, audio data, or data in any other format.

Figure 1B:
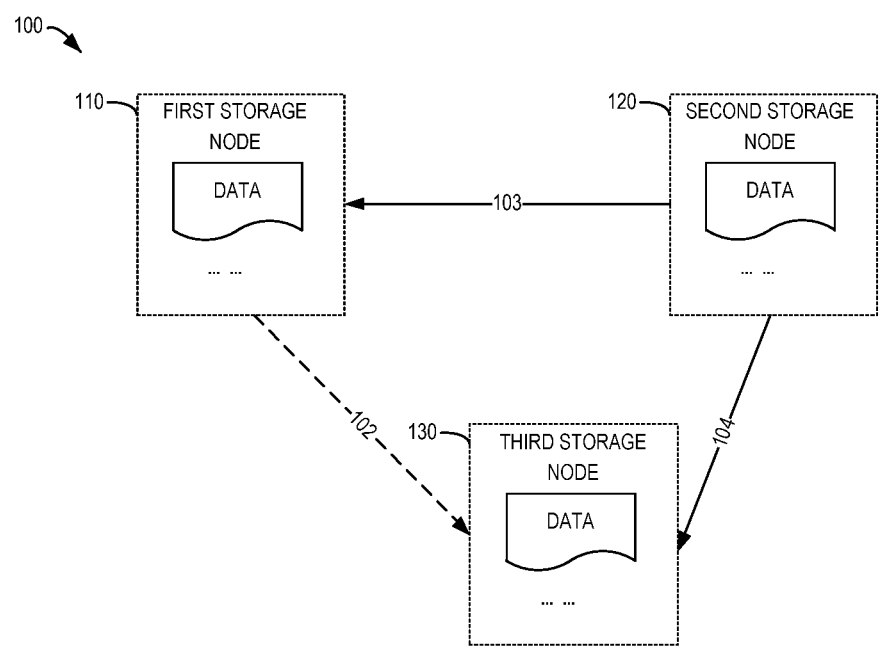

FIGS. 1A and 1B are schematic diagrams illustrating an environment in which embodiments of the present disclosure may be implemented. As shown in FIGS. 1A and 1B, the environment 100 includes storage nodes 110, 120 and 130, which are used for storing corresponding data and in together form a storage system for providing service to the customer. In the present disclosure, for ease of depiction, nodes 110, 120 and 130 are referred to as a first storage node, a second storage node and a third storage node, respectively. Those skilled in the art should understand that the above names are only used for distinguishing different nodes and do not limit to the storage nodes per se.

In the environment 100 shown by FIGS. 1A and 1B, in dependence on different nodes for providing services to the customer (namely, the primary storage node), there are different storage system application scenarios. For example, in the scenario of the environment 100 in FIG. 1A, the first storage node 110 is a node for providing service to the customer (namely, the primary storage node), and both the second storage node 120 and third storage node 130 are backup nodes for the first storage node 110 with the difference being in that the second storage node 120 is used for in real time backing up 101 data on the first storage node 110 while the third storage node 130 is used for periodically backing up 102 data on the first storage node 110.

In the scenario of the environment 100 shown in FIG. 1B, the second storage node 120 is a node for providing services to the customer (namely, the primary storage node), and both the first storage node 110 and third storage node 130 are backup nodes for the second storage node 120, where the first storage node 110 is used for in real time backing up 103 data on the second storage node 120 while the third storage node 130 is used for periodically backing up 104 data on the second storage node 120.

Different scenarios shown in FIGS. 1A and 1B and the switch between the two scenarios will be described below in detail.

In the scenario shown in FIG. 1A, the first storage node 110 is the primary storage node and therefore, data update on the first storage node 110 is backed up 101 in real time to the second storage node 120. In this way, data stored on the second storage node 120 is generally the same with that stored on the first storage node 110. Therefore, when the first storage node 110 fails to provide service to the customer due to various reasons, it may be switched to the second storage node 120. Under this condition, the second storage node 120 provides service to the customer and becomes a new primary storage node (namely, the scenario shown in FIG. 1B).

In the scenario shown in FIG. 1A, because the third storage node 130 is synchronized with the first storage node 110 periodically (which can be set, for instance, per month, day, hour, minute, etc.), data stored on the third storage node 130 is not always consistent with that on the first storage node 110. Therefore, in most cases, the third storage node 130 only provides a backup function and only in extreme conditions (for example, both the first storage node 110 and the second storage node 120 fail), it provides service to the public as a primary storage node (not shown).

There are multiple reasons why the first storage node 110 fails to provide service, mainly including two cases, namely, failing to provide services due to failure (referred to as "failover" hereinafter) and failing to provide services due to in need of reconfiguration (referred to as "proactive switch" hereinafter). Reconfiguration, for example, might occur when the first storage node 110 is overloaded and needs an adjustment.

If a switch from the scenario shown in FIG. 1A to the scenario shown in FIG. 1B occurs, namely, the node providing service to the public switches from the first storage node 110 to the second storage node 120, with reference to FIG. 1B, the second storage node 120 becomes the primary storage node. Then, the first storage node 110 in turn provides real-time backup 103 for the second storage node 120 while the third storage node 130 turns to provide regular backup 104 for the second storage node 120.

It shall be appreciated easily that during the process of providing regular backup 104 by the third storage node 130 for the second storage node 120, full backup from the second storage node 120 to the third storage node 130 should be avoided. Generally, common snapshots between the second storage node 120 and the third storage node 130 may be utilized to perform incremental backup to save resources and improve efficiency.

Common snapshots between the second storage node 120 and the third storage node 130 are generally formed in the following way: when the first storage node 110 provides services as primary storage node previously (in the environment shown in FIG. 1A), if data on the first storage node 110 is updated, the update will be backed up in real time to the second storage node 120; in the meanwhile, if a regular backup is also performed between the first storage node 110 and the third storage node 130, the update will also be backed up to the third storage node 130, and common snapshots between the first storage node 110 and third storage node 130 will be updated as well as a basis for the next regular backup. Since the second storage node 120 is a real-time backup for the first storage node 110, the updated snapshots between the first storage node 110 and third storage node 130 will also be synchronized into the second storage node 120 in real time and thus, the second storage node 120 and the third storage node 130 will have common snapshots.

It should be understood that FIGS. 1A and 1B only illustrate an example environment and the structure and the number of nodes are only illustrative, rather than being any limitation to embodiments of the present disclosure. This environment may include more storage nodes and associated backup operations. For example, taking FIG. 1A as an example, in addition to the storage node 120, the environment may further include other real-time backup storage nodes; besides the storage node 130, other regular backup storage nodes may also be included.

After the node providing services to the public switches from 110 to 120 (namely, the application scenario changes from FIG. 1A to FIG. 1B), with reference to FIG. 1B, if a data backup operation 102 between the first storage node 110 and the third storage node 130 generated before the switch and is still ongoing after the switch, the data backup operation 102 might collide with the storage system architecture after the switch (namely, the scenario shown in FIG. 1B), resulting in a series of problems.

For example, after the switch from the first storage node 110 to the second storage node 120, the first storage node 110 becomes the new real-time backup node so that the second storage node 120 becomes a source node for the data backup while the first storage node 110 becomes a destination node for the data backup. However, generally, in a storage system, as it is necessary to provide service to the public, the source node is required to be in a read-write mode while the destination node is required to be in a read-only mode. Therefore, the first storage node 110 stays in a read-only mode after the switch while the ongoing data backup operation 102 requires it to be in a read-write mode as being a source node, thus causing collision.

For another example, the data backup operation 102 involves both processing of information on the first storage node 110 and processing of information on the third storage node 130. If a further processing request for the data backup operation 102 involves processing of information on the third storage node 130 while the second storage node 120 also triggers a processing of the information on the third storage node 130, the two processing might collide.

For still another example, if the data backup operation 102 rewrites common snapshots (namely, polluted snapshots) with the second storage node 120 stored on the third storage node 130, the backup performed from the second storage node 120 to the third storage node 130 cannot be based on the snapshots and a full backup is required instead.

In addition, if a delete operation for the data backup operation 102 is received, the delete operation will delete information involved in the data backup operation 102 on the first storage node 110 and the third storage node 130. Correspondingly, snapshots on the third storage node 130 will also be deleted. As a result, an error might occur in the data backup operation 104 performed between the second storage node 120 and third storage node 130, because the second storage node 120 and the third storage node 130 do not have common snapshots therebetween.

Traditional solutions are either to wait until the data backup operation 102 from the first storage node 110 to the third storage node 130 is over and then switch from the first storage node 110 to the second storage node 120 (for the scenario of proactive switch), or to let the data backup operation 102 continue, wherein if the continued data backup operation 102 pollutes common snapshots between the second storage node 120 and the third storage node 130, full backup is implemented to perform regular backup between the second storage node 120 and the third storage node 130. Obviously, both solutions are costly and are unfavorable for saving resources.

To at least partly solve one or more of the above problems and other potential problems, embodiments of the present disclosure provide a scheme for data backup. In this solution, when the primary storage node providing service to the public switches, the ongoing data backup operation between the original primary storage node and the regular backup storage node ceases. In this way, the backup operation will not influence associated data on the regular backup storage node. Furthermore, the regular backup storage node can serve as backup storage node for the primary storage node after the switch and the two can perform incremental backup based on common snapshots, thereby saving resources and improving the efficiency.

Figure 2:
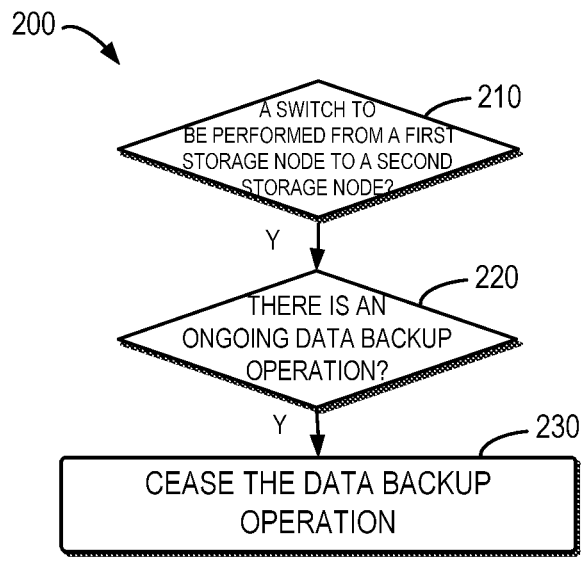
FIG. 2 is a flowchart illustrating a data backup method in accordance with embodiments of the present disclosure.

Reference will be made to the drawings to depict embodiments of the present disclosure. FIG. 2 is a flowchart illustrating a method 200 for data backup in accordance with embodiments of the present disclosure. The method 200 may be implemented by a controlling means (e.g., circuitry) of the storage system which can be executed integrally or distributedly on one or more of the storage nodes 110, 120 and 130. For ease of depiction, reference will be made to the system architecture of FIGS. 1A and 1B to describe method 200.

At 210, when a switch is to be performed from the first storage node 110 to the second storage node 120, it is determined at 220 whether there is an ongoing data backup operation between the first storage node 110 and the third storage node 130. In the scenario depicted above with reference to FIG. 1A, the second storage node 120 is used for backing up data for the first storage node 110 in real time and the third storage node 130 is used for backing up data for the first storage node 110 periodically. Moreover, as discussed above, the switch from the first storage node 110 to the second storage node may be a proactive switch or a failover. Different kinds of switches may result in differences in processing manner of the data backup operation, which will be described below in detail.

In some embodiments, it is possible to determine whether there is an ongoing data backup operation by the state of the operation recorded on the storage node. In particular, each storage node will record operations performed thereon and current states thereof. For example, if there is a data backup operation between the first storage node 110 and the third storage node 130, the storage node 110 and the storage node 130 will store records for the data backup operation respectively. With the data backup operation proceeding to different phases, states for the data backup operation recorded on the storage node 110 and the storage node 130 will also change accordingly.

Figure 3:
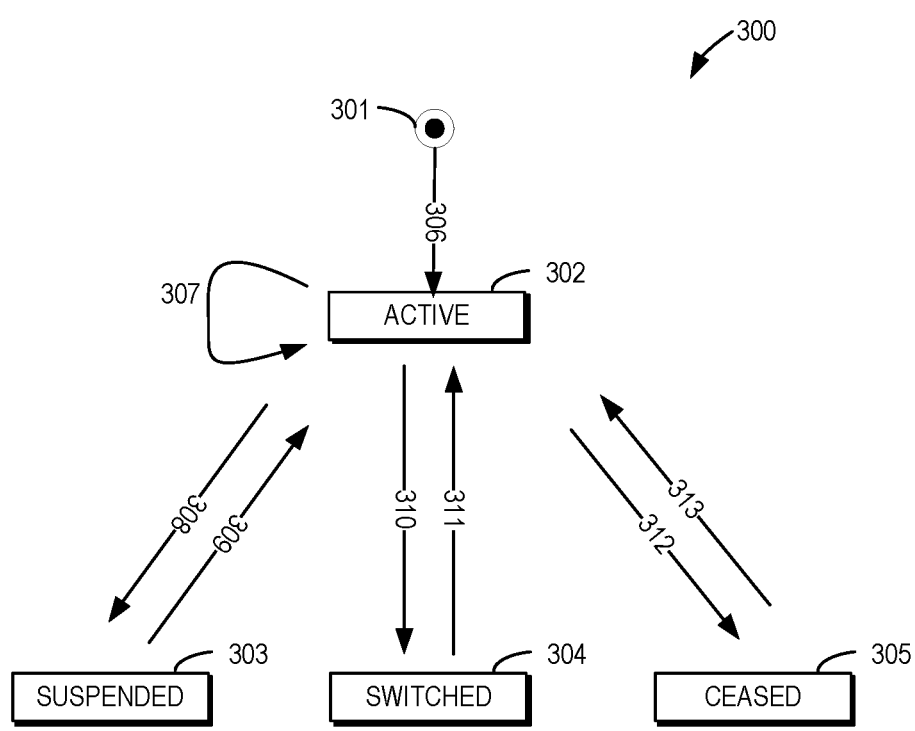
FIG. 3 is an example graph illustrating possible state changes of a data backup operation in accordance with embodiments of the present disclosure.

FIG. 3 is an example graph illustrating possible state changes of a regular data backup operation 102 in accordance with embodiments of the present disclosure. As shown in FIG. 3, there may be multiple states for the regular data backup operation 102, for example but not limited to, active state 302, suspended state 303, switched state 304 and ceased state 305. Those skilled in the art shall appreciate that these states are only illustrative examples and do not form limitation to embodiments of the present disclosure. In actual implementation, other states (such as terminating state) are possible as needed.

The active state 302, for instance, indicates that the data backup operation 102 is in a working state and performs data backup periodically. The suspended state 303, for instance, indicates that the data backup operation 102 is suspended for the moment and in a non-working state but relevant records are retained. The switched state 304, for instance, indicates that data backup operation 102 ceases working due to the original destination storage node (such as 130) having become the new primary storage node while related records are still retained. The ceased state 304, for instance, shows that the data backup operation 102 ceases working because the primary storage node has been switched from the source storage node (such as 110) to the original real-time backup storage node (such as 120) and other corresponding operations are also affected (depicted below in detail). The regular data backup operation 102 may switch between the above states 302-305 as per the corresponding operation request, which will be described below in detail.

First, the data backup operation is originally generated through an initialization 301 operation. The data backup operation, after being initialized 301, enters the active state 302 as per a request 306 for creation, which means that the data backup operation may, in response to a request 307 for backup being sent out on a preset period basis, implement data backup operation from the first storage node 110 to the third storage node 130, for instance. The data backup operation 102 in the active state 302 stays in the active state 302 each time after implementing data backup, so as to wait to receive a request 307 for data backup of a next period. In addition to automatic regular backup, the data backup operation 102 in the active state 302 may also receive a user's request 307 for backup and perform the backup. Implementing the request 307 for backup from the user also causes the data backup operation 102 originally in the active state 302 to remain in the active state 302.

Next, after receiving a request 308 to suspend the data backup operation 102 in the active state 302, the data backup operation 102 will be paused or suspended and its state will changes from the active state 302 to the suspended state 303. It is until a request 309 to resume the data backup operation is received that the state of the data backup operation returns from the suspended state 303 to the active state 302. The request 308 for suspension may be sent out by a user via an interface such as GUI (graphical user interface), REST (Representational State Transfer), API, CLI (Command Line Interface) or be sent out automatically by the storage system in response to, for instance, an accident event. Embodiments of the present disclosure are not limited in this regard.

In some embodiments, a data backup operation in the active state 302 may also receive a switch request 310 for it, which means that primary storage node for providing services to the public should be switched from the original storage node 110 to the third storage node 130. As mentioned above, since the third storage node 130 provides a regular data backup rather than a real-time data backup, in most cases, it is only used for backup storage and will not be switched to be the primary storage node providing service to the public.

However, in extreme cases, for example, when both the first storage node 110 and the second storage node 120 fail, it is possible to effect the switch from the first storage node 110 to the third storage node 130 automatically or in response to a user's request. Then, the state of the data backup operation changes to the switched state 304 correspondingly. When the original primary storage node (for instance, the first storage node 110) is restored and switched back to the node providing service to the public, a request 311 to resume the data backup operation will be triggered. The data backup operation 102 in the switched state 304 turns again into the active state 302 because of the request 311 for resumption.

Figure 4:
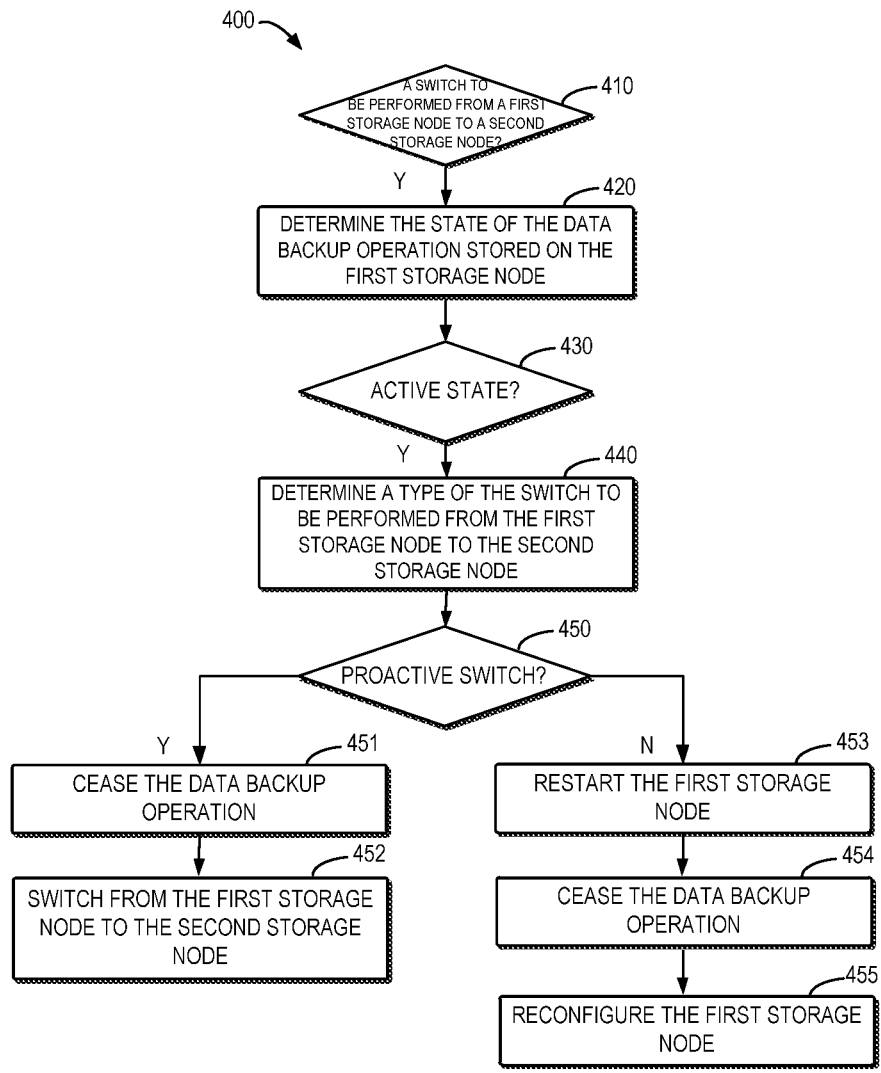
FIG. 4 is a flowchart illustrating a data backup method in accordance with further embodiments of the present disclosure.

Reference is made to FIG. 3 above to depict the possible states of the data backup operation 102 performed periodically. In some embodiments, these states may be applied to the data backup process according to embodiments of the present disclosure. For example, FIG. 4 is a flowchart illustrating a method 400 for further data backup according to embodiments of the present disclosure. As shown in FIG. 4, in some embodiments, at 410, when a switch is to be performed from the first storage node 110 to the second storage node 120, it may be determined at 420 the state of the data backup operation 102 stored on the first storage node 110. When it is determined at 430 that the state of the data backup operation 102 is the active state 302 shown in FIG. 3, it is determined that there is an ongoing data backup operation 102 between the first storage node 110 and the third storage node 130. It is efficient and convenient to determine whether the data backup operation 102 is performed based its state, which facilitates further improving the efficiency.

Continuing to refer to FIG. 2, when it is determined at 220 that there is an ongoing data backup operation, next at 230, in response to an ongoing data backup operation between the first storage node 110 and the third storage node 130, the data backup operation is ceased.

In some embodiments, ceasing the data backup operation 102 may include releasing at least one of a resource and a command associated with the data backup operation 102. Generally, the ongoing data backup operation 102 records corresponding commands in the command database and releasing an associated command may ensure ceasing the data backup operation to avoid operating the third storage node 130, so as to avoid collision with the operation of the second storage node 120 to the third storage node 130. In particular, releasing a command in the command database may be performed in the following way: firstly, finding the command to be released in the command database, and sending out a request to release the command so that the command is released from the command database.

In addition to the command associated with the data backup operation 102, generally, there are resources associated therewith, for instance, storage resources for storing intermediate data, computing resources for performing associated operations, etc. In some embodiments, ceasing the data backup operation 102 may further include releasing associated storage, computing and other resources to reduce occupancy of resources and improve utilization rate of resources.

In some embodiments, ceasing the data backup operation 102 in 230 may include setting the state of the data backup operation 102 to the ceased state 305 shown in FIG. 3 to indicate that the data backup operation has been ceased. This process may be illustrated with FIG. 3. As stated above, the ongoing data backup operation 102 will be in the active state 302. Being in this state, if a request 312 to cease the data backup operation 102 is received (the request 312 generally comes from the system but may also be triggered by a user), the data backup operation will turn from the original active state 302 to the ceased state 305.

Setting the state of the data backup operation 102 to ceased state 305 can provide an identifier for the data backup operation advantageously for query by the system to trigger the subsequent related operations (described in greater detail below). In addition, it is also convenient for the user to learn about the state of the data backup operation.

It should be noted that since both the first storage node 110 and the third storage node 130 maintain corresponding operation records and corresponding states for the data backup operation 102, in some embodiments, the state recorded by the data backup operation 102 on the original primary storage node (namely, the first storage node 110) may be modified as ceased state 305 while the recorded state of the data backup operation 102 on the backup storage node (namely, the third storage node 130) remains unchanged. However, it is to be understood that other ways of modification (for instance, modifying the recorded state of the data backup operation 102 on both storage nodes as ceased state 305) are also feasible. Embodiments of the present disclosure are not limited in this regard.

In this way, data on the backup storage node (namely, the third storage node 130) is as unaffected as possible so that common snapshots with the second storage node 120 are still retained when the primary storage node providing services switches from the first storage node 110 to the second storage node 120 and during the process that the third storage node 130 is switched to be the backup storage node for the second storage node 120, thereby avoiding a full backup of data from the second storage node 120 to the third storage node 130.

As illustrated in FIG. 3, in some embodiments, the data backup operation in the ceased state 305 generally does not return to the active state 302 until a request 313 for preservation is received. In particular, referring to FIGS. 1A and 1B, after the primary storage node providing service to the public is switched from the first storage node 110 to the second storage node 120, and then switched back from the second storage node 120 to the first storage node 110 for some reasons, a request 313 for preservation is triggered for the data backup operation 102 from the first storage node 110 to the third storage node 130. Then, the third storage node 130 becomes a backup storage node for the first storage node 110 again. The preserve operation 313 causes the recorded state on the first storage node 110 associated with the data backup operation 102 from the first storage node 110 to the third storage node 130 to return from the ceased state 305 to the active state 302.

In some embodiments, the ceasing data backup operation in 220 further includes determining the type of the switch to be performed from the first storage node 110 to the second storage node 120, which may be further depicted with reference to FIG. 4. As shown in FIG. 4, when it is determined at 430 that the state of the data backup operation 102 at the first storage node 110 is an active state, it may be further determined at 440 the type of switch to be performed from the first storage node 110 to the second storage node 120. For example, it is determined at 450 whether to perform a failover to the second storage node 120 due to the first storage node 110 being failure (the result determined at 450 being N) or a proactive switch to the second storage node 120 due to the first storage node 110 being in need of reconfiguration (the result determined at 450 being Y).

In some embodiments, when the result determined at 450 is a proactive switch, it is possible to cease the data backup operation 102 at 451 first and then perform the switch from the first storage node 110 to the second storage node 120 at 452. In other words, the data backup operation 102 is ceased before the proactive switch.

As depicted above, after the primary storage node providing services to the public is switched from the first storage node 110 to the second storage node 120, the first storage node 110 will become a backup storage node, namely, destination node, for the second storage node 120, and thus will be set in a read-only mode while the second storage node 120 should be set in a read-write mode since it has become a new source node.

To this end, the switch from the first storage node 110 to the second storage node 120 generally includes the following steps: first, the first storage node 110 is reset from the read-write mode to the read-only mode; then the second storage node 120 is reset from the read-only mode to the read-write mode. In this process, after the first storage node 110 has already been set in the read-only mode and before the second storage node 120 is set in the read-write mode, both storage nodes will be in the read-only mode and cannot provide data service to the public, rendering the storage system in a data unavailable state.

As the timing for a proactive switch is selectable, to reduce the time for the data unavailable state as much as possible, the data backup operation may be ceased before the first storage node 110 is reset from the read-write mode to the read-only mode; or more directly, the data backup operation maybe ceased before the proactive switch. As a matter of course, it is possible to implement the cease of the data backup operation at other timing (for example, after the second storage node 120 is reset from the read-only mode to the read-write mode). Embodiments of the present disclosure are not limited in this regard.

In some embodiments, when the result determined at 450 is a non-proactive switch (namely, failover), first, 453 is performed to restart the first storage node 110; then 454 is implemented to cease the data backup operation; and subsequently, 455 is implemented to reconfigure the first storage node 110. In other words, after the first storage node 110 is restarted and before it is reconfigured, the data backup operation 102 is ceased.

Generally, in the scenario of failover, the failure of the first storage node 110 will cause the primary storage node to switch from it to the second storage node 120. Then, the first storage node 110 will be restarted and reconfigured to become the real-time backup storage node of the second storage node 120. In some embodiments, the reconfiguration may include, for instance, resetting the first storage node 110 from a read-write mode to a read-only mode, or switching off its network interface providing service to the public and so on.

As depicted above, the fact that the first storage node 110 is in a read-only mode may collide with the requirement of the ongoing data backup operation from the first storage node 110 to the third storage node 130. To avoid the occurrence of such collision as much as possible, in some embodiments, in the scenario of failover, it is possible to cease the data backup operation after the first storage node 110 is restarted and before it is reconfigured.

In some embodiments, after the data backup operation has been ceased, a further request to process the data backup operation will also be affected. In particular, for example, when a request to delete the data backup operation is received, information associated with the data backup operation on the first storage node 110 will be deleted, while information associated with the data backup operation on the third storage node 130 will be retained. In a further embodiment, the information includes at least one of a states and a data snapshot associated with the data backup operation.

As mentioned above, for the data backup operation from the first storage node 110 to the third storage node 130, the operation and its current state will be recorded respectively on the first storage node 110 and the third storage node 130.

After a request to delete the data backup operation is received, only information associated with the data backup operation on the first storage node 110 is deleted, while information associated with the data backup operation on the third storage node 130 is retained so as to retain common snapshots on the third storage node 130 with the second storage node 120 as much as possible. Thus, when data is backed up from the second storage node 120 to the third storage node 130, incremental backup can be performed based on the common snapshots, thereby avoiding a full backup.

Still referring to FIGS. 1A, 1B and 3, during the data backup operation 102, there may be multiple requests, such as a request 308 to pause/suspend or a request 309 to resume for the data backup operation 102 mentioned above. In some embodiments, when the data backup operation has been ceased (namely, in the ceased state 305), these requests may be rejected, that is, ceasing response to this kind of requests. In some embodiments, when the data backup operation 102 has been ceased, a request for a data write operation from the first storage node 110 to the third storage node 130, or a request for a switch from the first storage node 110 to the third storage node 130 may also be rejected (that is, rejecting the switch of the primary storage node providing service to the public from the first storage node 110 to the third storage node 130).

The advantage of rejecting the requests for these operations is to prevent these operations from disadvantageously polluting data on the third storage node 130, for instance, its common snapshots with the second storage node 120, so as to avoid a full copy from the second storage node 120 to the third storage node 130.

In combination with FIGS. 1A, 1B and 3 and with reference to FIGS. 2 and 4, the scheme for date backup among multiple storage nodes of the storage system is depicted above. With this scheme, it is possible to prevent pollution to data snapshots on the regular backup storage nodes so as to avoid the occurrence of a full backup and prevent abnormalities caused by collision between operations, thereby saving resources and improving efficiency.

Figure 5:
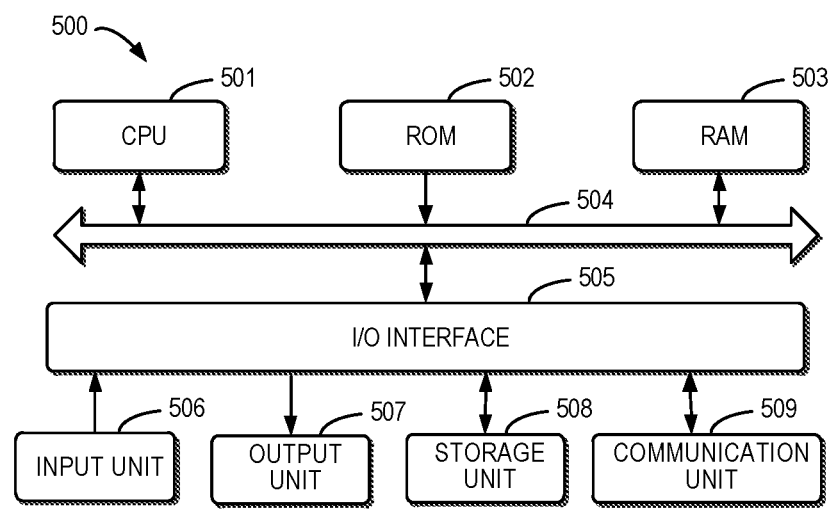
FIG. 5 is a block diagram illustrating an example apparatus that may be used to implement embodiments of the present disclosure.

FIG. 5 is a schematic block diagram illustrating an electronic apparatus 500 that may be used to implement embodiments of the present disclosure. The apparatus 500 may be used to implement methods 200 and 400 for data backup shown in FIGS. 2 and 4. As illustrated in FIG. 5, the apparatus 500 includes a central processing unit (CPU) 501 which can execute various appropriate actions and processing based on the computer program instructions stored in a read-only memory (ROM) 502 or the computer program instructions loaded into a random access memory (RAM) 503 from a storage unit 508. The RAM 503 also stores all kinds of programs and data required by operating the storage apparatus 500. CPU 501, ROM 502 and RAM 503 are connected to each other via a bus 504 to which an input/output (I/O) interface 505 is also connected.

A plurality of components in the apparatus 500 are connected to the I/O interface 505, including: an input unit 506, such as a keyboard, a mouse and the like; an output unit 507, such as various types of displayers, loudspeakers and the like; a storage unit 508, such as a magnetic disk, an optical disk and the like; and a communication unit 509, such as a network card, a modem, a wireless communication transceiver and the like. The communication unit 509 allows the apparatus 500 to exchange information/data with other devices through computer networks such as Internet and/or various telecommunication networks.

Each procedure and processing as described above, such as the method 200 and/or method 400 for data backup, is executed by the processing unit 501. For example, in some embodiments, the method 200 and/or method 400 can be implemented as computer software programs, which are tangibly included in a machine-readable medium, such as the storage unit 508. In some embodiments, the computer program can be partially or completely loaded and/or installed to the apparatus 500 via the ROM 502 and/or the communication unit 509. When the computer program is loaded to the RAM 503 and executed by the CPU 501, one or more operations of the above described method 200 are implemented. Alternatively, in other embodiments, CPU 501 may be configured to implement one or more operations of the method 200 and/or method 400 in any other proper manner (for example, by means of firmware).

It should be further indicated that the present disclosure may be a method, an apparatus, a system and/or a computer program product. The computer program product may include a computer readable storage medium having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method for data backup, comprising:
in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically; and
in response to the ongoing data backup operation between the first and third storage nodes, ceasing the data backup operation;
wherein determining whether there is an ongoing data backup operation between the first and third storage nodes comprises:
determining a state of the data backup operation stored at the first storage node; and
in response to the state being an active state, determining that there is an ongoing data backup operation between the first and third storage nodes.

2. The method according to claim 1, wherein ceasing the data backup operation comprises:
releasing at least one of a resource and a command associated with the data backup operation.

3. The method according to claim 1, wherein ceasing the data backup operation comprises:
setting a state of the data backup operation to a ceased state to indicate that the data backup operation has been ceased.

4. The method according to claim 1, wherein ceasing the data backup operation comprises:
determining a type of the switch to be performed from the first storage node to the second storage node;
in response to the type indicating that the switch is a proactive switch, ceasing the data backup operation before the proactive switch; and in response to the type indicating that the switch is a failover, ceasing the data backup operation after a restart of the first storage node and before reconfiguration of the first storage node.

5. The method according to claim 1, further comprising:
in response to receiving a request to delete the data backup operation, deleting information associated with the data backup operation on the first storage node, wherein the information associated with the data backup operation is retained on the third storage node.

6. The method according to claim 5, wherein the information comprises at least one of a state and a data snapshot associated with the data backup operation.

7. The method according to claim 1, further comprising ceasing a response to at least one of the following:
a request to suspend the data backup operation,
a request to resume the data backup operation,
a request for a data write operation from the first storage node to the third storage node, and
a request to a switch operation from the first storage node to the third storage node.

8. An apparatus for data backup, comprising:
a processor; and
a memory coupled to the processor, the memory having instructions stored therein which, when executed by the processor, cause the apparatus to perform acts, comprising:
in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically,
in response to the ongoing data backup operation between the first and third storage nodes, ceasing the data backup operation and
in response to receiving a request to delete the data backup operation, deleting information associated with the data backup operation on the first storage node, wherein the information associated with the data backup operation is retained on the third storage node.

9. The apparatus according to claim 8, wherein determining whether there is an ongoing data backup operation between the first and third storage nodes comprises:
determining a state of the data backup operation stored at the first storage node; and
in response to the state being an active state, determining that there is an ongoing data backup operation between the first and third storage nodes.

10. The apparatus according to claim 8, wherein ceasing the data backup operation comprises:
releasing at least one of a resource and a command associated with the data backup operation.

11. The apparatus according to claim 8, wherein ceasing the data backup operation comprises:
setting a state of the data backup operation to a ceased state to indicate that the data backup operation has been ceased.

12. The apparatus according to claim 8, wherein ceasing the data backup operation comprises:
determining a type of the switch to be performed from the first storage node to the second storage node;
in response to the type indicating that the switch is a proactive switch, ceasing the data backup operation before the proactive switch; and
in response to the type indicating that the switch is a failover, ceasing the data backup operation after a restart of the first storage node and before reconfiguration of the first storage node.

13. The apparatus according to claim 8, wherein the information comprises at least one of a state and a data snapshot associated with the data backup operation.

14. The apparatus according to claim 8, the acts further comprising ceasing a response to at least one of the following:
a request to suspend the data backup operation,
a request to resume the data backup operation,
a request for a data write operation from the first storage node to the third storage node, and
a request for a switch operation from the first storage node to the third storage node.

15. A computer program product having a non-transitory computer readable medium which stores a set of instructions to perform data backup; the set of instructions, when carried out by computerized circuitry, causing the computerized circuitry to perform a method of:
in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically;
in response to the ongoing data backup operation between the first and third storage nodes, ceasing the data backup operation; and
ceasing a response to at least one of the following:
a request to suspend the data backup operation,
a request to resume the data backup operation,
a request for a data write operation from the first storage node to the third storage node, and
a request to a switch operation from the first storage node to the third storage node.

16. The computer program product according to claim 15, wherein the method further comprises:
in response to receiving a request to delete the data backup operation, deleting information associated with the data backup operation on the first storage node, wherein the information associated with the data backup operation is retained on the third storage node.

17. A method for data backup, comprising:
in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically; and
in response to the ongoing data backup operation between the first and third storage nodes, ceasing the data backup operation;
wherein ceasing the data backup operation comprises:
determining a type of the switch to be performed from the first storage node to the second storage node;
in response to the type indicating that the switch is a proactive switch, ceasing the data backup operation before the proactive switch; and in response to the type indicating that the switch is a failover, ceasing the data backup operation after a restart of the first storage node and before reconfiguration of the first storage node.

18. A method for data backup, comprising:

in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically;

in response to the ongoing data backup operation between the first and third storage nodes, ceasing the data backup operation; and in response to receiving a request to delete the data backup operation, deleting information associated with the data backup operation on the first storage node, wherein the information associated with the data backup operation is retained on the third storage node.

19. The method according to claim 18, wherein the information comprises at least one of a state and a data snapshot associated with the data backup operation.

20. A method for data backup, comprising:

in response to a switch to be performed from a first storage node to a second storage node, determining whether there is an ongoing data backup operation between the first storage node and a third storage node, the second storage node being used for backing up data of the first storage node in real time, and the third storage node being used for backing up the data of the first storage node periodically;

in response to the ongoing data backup operation between the first and third storage nodes, ceasing the data backup operation; and ceasing a response to at least one of the following:
    a request to suspend the data backup operation,
    a request to resume the data backup operation,
    a request for a data write operation from the first storage node to the third storage node, and
    a request to a switch operation from the first storage node to the third storage node.

\* \* \* \* \*